March 17, 1953  J. H. COX  2,631,717
SAFETY DEVICE FOR BELT CONVEYERS
Filed Nov. 30, 1950  2 SHEETS—SHEET 1
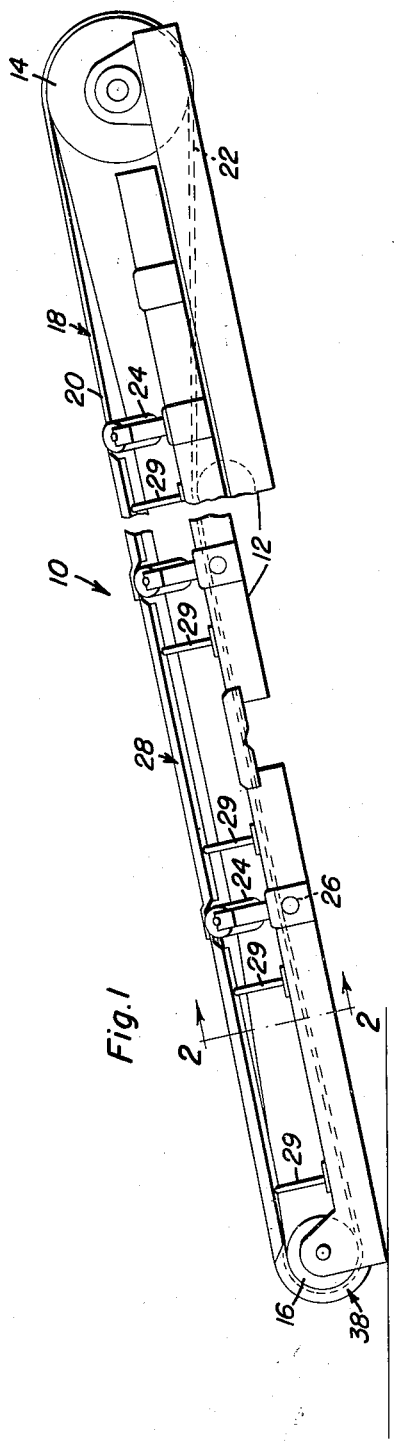
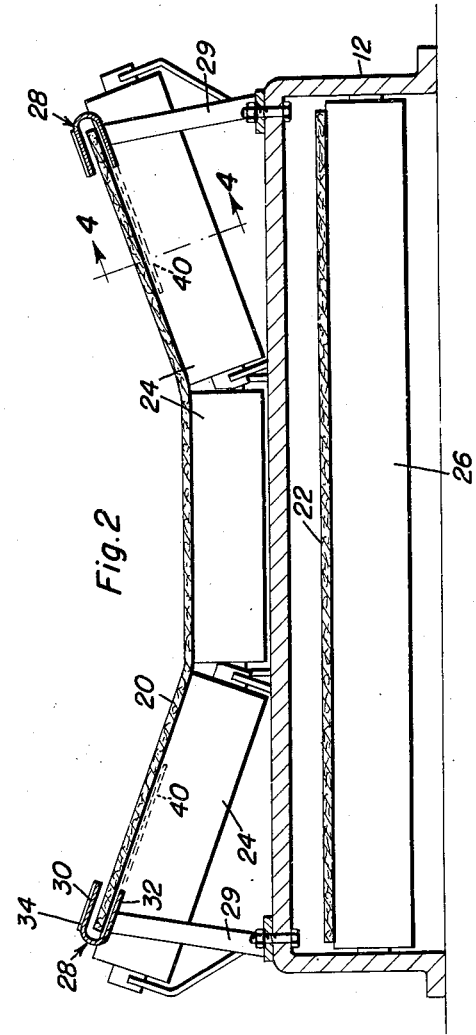
John H. Cox
INVENTOR.

March 17, 1953 J. H. COX 2,631,717
SAFETY DEVICE FOR BELT CONVEYERS
Filed Nov. 30, 1950 2 SHEETS—SHEET 2
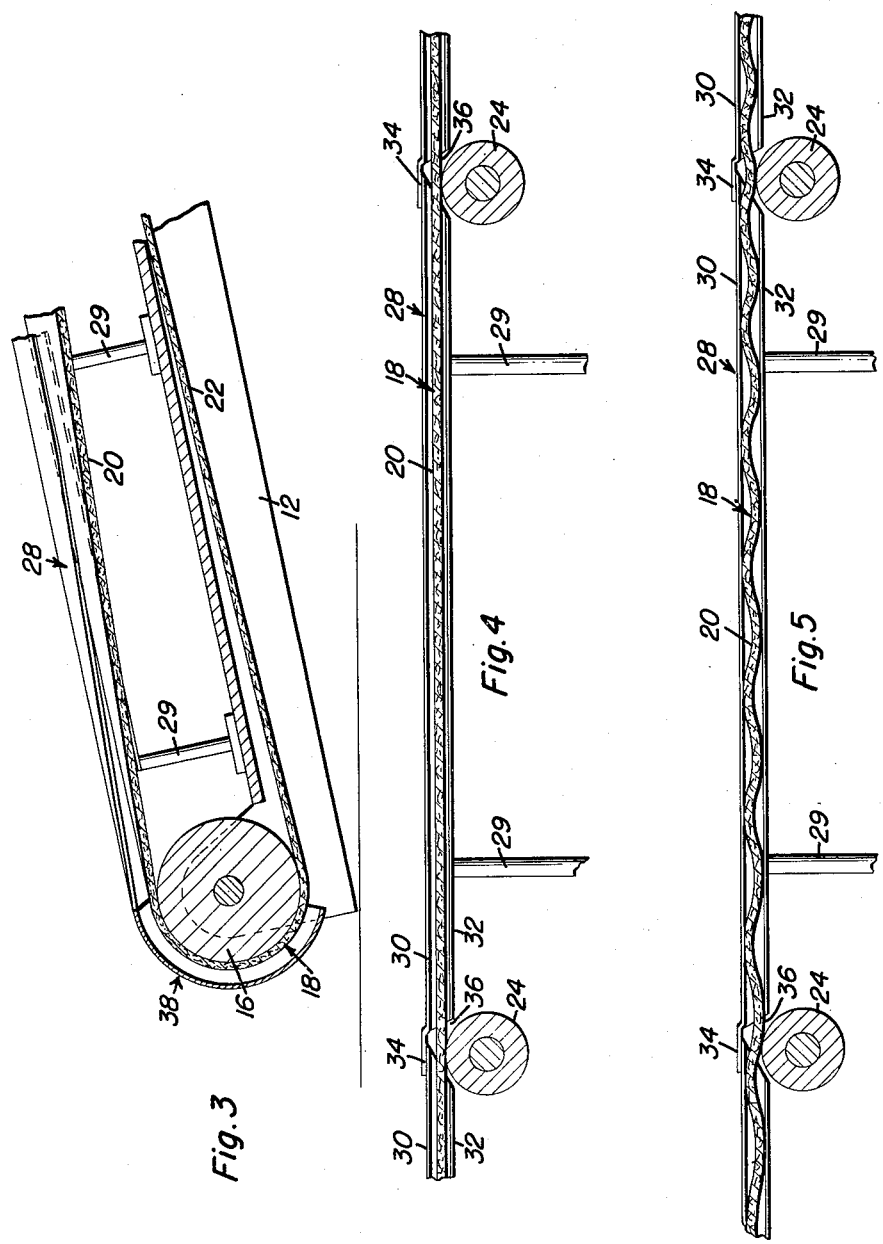
John H. Cox
INVENTOR.

Patented Mar. 17, 1953

2,631,717

UNITED STATES PATENT OFFICE 2,631,717

SAFETY DEVICE FOR BELT CONVEYERS

John H. Cox, New Philadelphia, Ohio

Application November 30, 1950, Serial No. 198,293

2 Claims. (Cl. 198—202)

1

This invention relates to new and useful improvements and structural refinements in belt conveyors, particularly inclined belt conveyors such as are used in mining and manufacturing industries for transferring material from one level to another.

Conveyors of this type are frequently of considerable length, perhaps a mile or more, and when under certain circumstances the belt of the conveyor breaks, the belt as well as the material thereon travels very swiftly to the bottom or lower level, thus greatly endangering the lives of workmen and destroying power lines, timbers, and other equipment located in the vicinity of the conveyor.

The principal object of the instant invention is, therefore, to completely eliminate hazards such as those mentioned above, this being achieved not by attempting to prevent breakage of the conveyor belt, but by providing means for preventing the broken belt and the material thereon from speeding to the lower level.

Some of the advantages of the invention reside in its extreme simplicity of construction, in its efficient and dependable operation, and in its adaptability for convenient and economical installation in belt conveyors of different types and sizes.

With the above more important objects and features in view and such other objects and features as may become apparent as this specification proceeds, the invention consists essentially of the arrangement and construction of parts as illustrated in the accompanying drawings, in which:

Figure 1 is a side elevational view of an inclined belt conveyor embodying the invention;

Figure 2 is a transverse sectional detail, on an enlarged scale, taken substantially in the plane of the line 2—2 in Figure 1;

Figure 3 is a fragmentary longitudinal sectional view showing the lower end portion of the conveyor;

Figure 4 is a fragmentary sectional detail, taken substantially in the plane of the line 4—4 in Figure 2 and illustrating the belt under normal conditions; and Figure 5 is a fragmentary sectional view, similar to that shown in Figure 4, but illustrating the belt after breakage.

Like characters of reference are employed to designate like parts in the specification and throughout the several views.

Referring now to the accompanying drawings in detail, the general reference character 10 designates an inclined belt conveyor including an elongated frame 12 provided at the upper and lower ends thereof with the respective upper and lower end rollers 14, 16 to engage a flexible, endless conveyor belt 18.

The belt 18 has an upper stretch 20 and a lower stretch 22, the upper stretch 20 passing over a set of transverse rollers 24 which are mounted in angular relation on the frame 12 so as to support the upper stretch 20 of the belt in the form of a trough for carrying material. (See Figure 2.) A plurality of straight rollers 26 are provided within the frame 12 for supporting the lower, return stretch of the belt, as shown.

The invention resides in the provision of a safety device comprising two sets of channels 28, which are substantially U-shaped and are supported by a plurality of brackets 29 of the conveyor frame 12, so that they receive therein the opposite longitudinal edge portions of the upper stretch 20 of the belt 18, as is clearly shown in Figure 2.

Each set of the channels 28 may assume the form of a plurality of longitudinally aligned sections, each section being open at the inner side thereof and including spaced upper and lower walls 30, 32, respectively, an end portion of the upper wall of each section being upwardly offset as at 34 and overlapped over the upper wall of the section adjacent thereto, whereby inner surfaces of the upper walls of the several sections in each set are co-planar as indicated in Figures 4 and 5. The lower walls 32 of the channel sections are beveled at the ends thereof so as to provide recesses 36 to accommodate the rollers 24.

The distance between the upper and lower walls 30, 32 of the channel sections is such that when the belt 18 is not broken, the upper stretch 20 of the belt travels smoothly through the channels 28 without contacting the same. However, if the belt becomes broken, the weight thereof as well as of the material thereon will cause the belt to "ripple" or "undulate" as shown in Figure 5, and the undulated belt will come in frictional contact with the walls 30, 32 of the channels 28 so that downward speeding of the belt and material will be prevented.

It is to be noted that at the point where the channels 28 extend to the lower roller 16, arcuate extensions 38 are provided at the lower ends of the channels so as to extend almost half way around the roller 16 in spaced relation from the belt 18, thus further assisting in preventing downward sliding of the belt in the event of breakage.

It will be observed that although the channels 28 have been described as being substantially U-shaped, the lower walls 32 thereof may be extended as illustrated by the dotted line 40 in Figure 2, so as to provide additional support for the upper stretch 20 of the belt 18 and prevent the belt from sliding inwardly and downwardly out of the guide channels.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

1. The combination of a belt conveyor including an inclined elongated frame, a plurality of transverse rollers provided at longitudinally spaced points on said frame, and an endless conveyor belt passing over said rollers and having an upper material carrying stretch and a lower return stretch, a plurality of brackets secured at longitudinally spaced points and at opposite side edges to said frame, and a pair of U-shaped channels carried by said brackets and embracing opposite side edge portions at both upper and lower surfaces of substantially the entire length of the material carrying stretch of said belt, said channels being of such size as to normally clear the belt but to effect frictional engagement and wedging with the belt when tension on the belt is released.

2. The device as defined in claim 1 wherein said channels at opposite sides of said belt are disposed in mutually inclined planes.

JOHN H. COX.

REFERENCES CITED

The following references are of record in the file of this patent:

UNITED STATES PATENTS

| Number | Name | Date |
|---|---|---|
| 1,718,150 | Hurxthal et al. | June 18, 1929 |
| 2,105,889 | Madeira | Jan. 18, 1939 |

FOREIGN PATENTS

| Number | Country | Date |
|---|---|---|
| 466,325 | Great Britain | May 26, 1937 |